June 18, 1957 A. NYMAN 2,796,461

ON AND OFF MODULATOR

Filed Oct. 10, 1951

Inventor
Alexander Nyman
by Roberts, Cushman & Grover
Att'ys.

United States Patent Office 2,796,461

Patented June 18, 1957

2,796,461

ON AND OFF MODULATOR

Alexander Nyman, Dover, Mass., assignor to Alden Products Co., Brockton, Mass., a corporation of Massachusetts Application October 10, 1951, Serial No. 250,619

3 Claims. (Cl. 178—6)

In many facsimile applications it is desirable to obtain an exact copy as possible by reproducing, in addition to the black and white value of light, the intermediate shades of gray so that in the past it has been considered essential to introduce a carrier frequency into the facsimile signals due to the fact that gradual changes in shading from black to gray and to white had to be reproduced with a greatest degree of similitude and the resulting slow changes in signal current were difficult to amplify and transmit without distortion. However in many types of facsimile copy, for example printed or typewritten material, lined drawings or half tone pictures which consist essentially of black and white elements, the shades of gray are unimportant in that they do not make the resulting copy more intelligible and may be objectionable in that the legibility is reduced because of the reproduction in the copy of defects such as blurs and smudges.

It is accordingly the principal objects of this invention to provide a modulation system which has a maximum output when the input signal is below a predetermined value, which has a substantially zero output when the input signal rises above the predetermined value, which does not require a carrier frequency, which requires a minimum of band width for transmission of the signals, which requires a minimum of conventional circuit elements, which can be readily adjusted, which requires a minimum of maintenance, and which advances the art generally.

In a broad aspect the invention contemplates a modulation system which is particularly suitable for transmitting electrical signals defining the facsimile of an image in which only the presence of black or white is essential. This system comprises means, such as a photoelectric cell, which is responsive to modification of light due to an optical characteristic of the image for example a change in the light received by either transmission or reflection from the subject copy. The photoelectric cell is connected to bias a vacuum tube beyond cutoff whenever the light received from the white or lighter shades of the copy exceeds a predetermined value or amount. An amplifier is connected to receive the output of the vacuum tube as an input signal so that whenever the tube is cutoff the output of the amplifier drops to substantially zero. The amplifier includes clipping means whereby the maximum output of the amplifier is limited whenever the light received by the photoelectric cell falls below the same or approximately the same predetermined value.

In a more specific aspect the vacuum tube electrodes include at least an anode and a cathode respectively connected to the terminals of a direct power source and a control electrode, which is connected to an intermediate tap of a biasing resistor whose ends are connected to the power source terminals thereby to supply a potential for biasing the tube beyond cutoff in the presence of a negative signal. The electrodes of the photoelectric cell are connected between the control electrode and negative end of the biasing resistor in parallel with a portion of a bleeder resistor which is connected across the power source thereby to cause the tube control electrode to become relatively more negative so as to maintain the tube cutoff whenever relatively great amounts of incident light impinging upon the photoelectric cell reduces its effective resistance whereby a definite maximum value is obtained for the negative input signal. Conversely, when relatively no light impinges upon the cell so that its effective impedance is high, the bias potential upon the control electrode of the tube becomes relatively more positive causing the tube to conduct.

In another specific aspect the control electrode of a second vacuum tube, which is operated with bias, is coupled to the anode of the first vacuum tube so that the output of the tube is clipped to the same maximum value irrespective of the value of the positive input signal applied to the control electrode by the first tube.

Further objects and aspects relating to various features of the invention will be apparent from a consideration of the following description and accompanying drawing wherein.

Figures 1, 2:
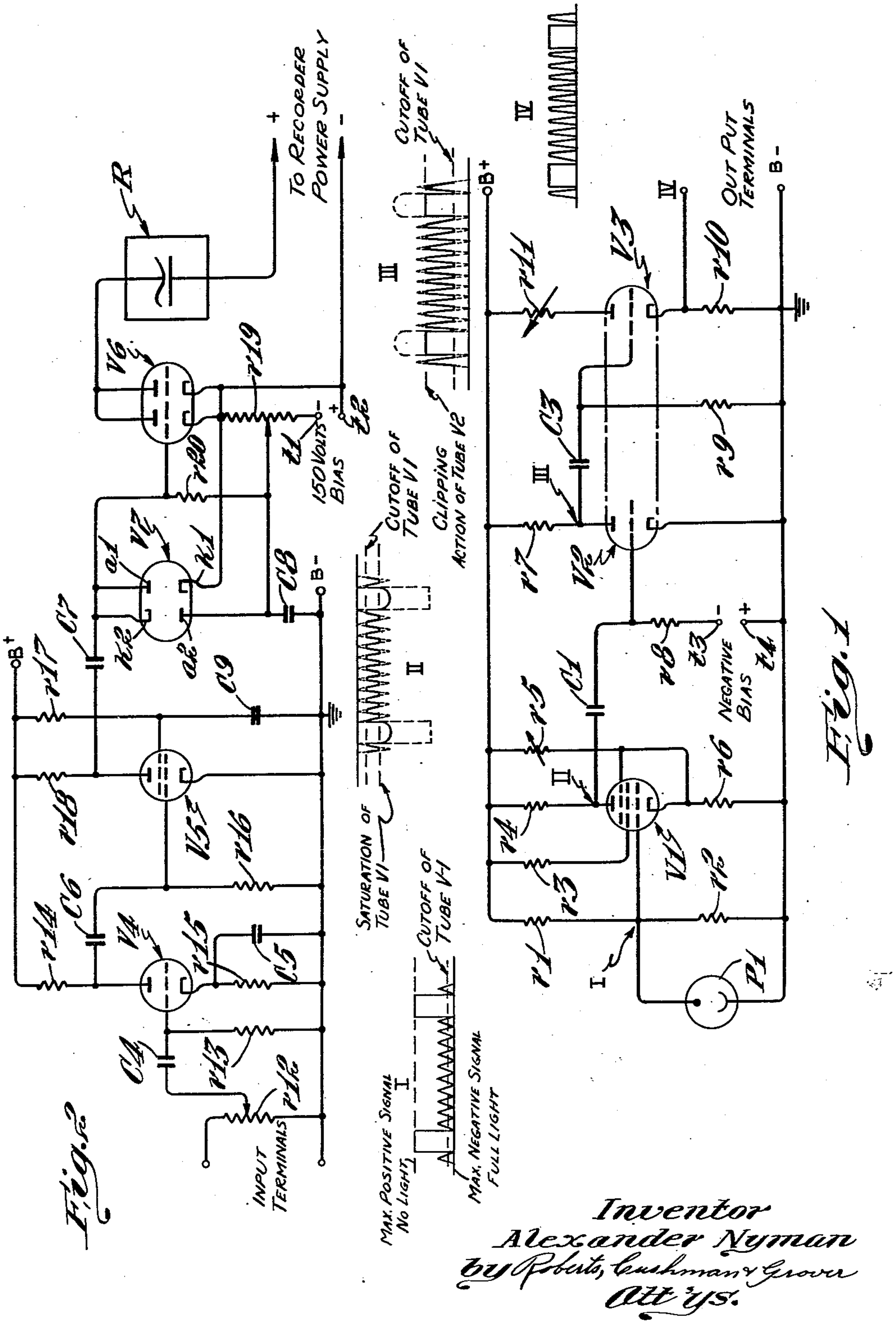
Fig. 1 is the wiring diagram of a transmitter unit.
Fig. 2 is the wiring diagram of a receiver unit.

The modulating system chosen for the purpose of illustration is for use with facsimile apparatus wherein the transmitter and receiver are often widely separated physically being electrically interconnected by a communications link such as a telephone line, coaxial cable or radio depending upon the distance therebetween. Accordingly, the system is divided into transmitting and receiving units which are located respectively at the opposite ends of the communications link. The transmitting unit, shown diagrammatically in Fig. 1, includes a photoelectrical cell P1, preferably of the multiplier tube type such as is commercially designated 931-A which may be mounted in an optical scanning head for a helical scanner such as is shown in my copending application Serial No. 205,731, filed January 12, 1951, or in an optical scanner such as is shown in my copending application Serial No. 227,144, filed May 19, 1951. In either case light rays coming from sequentially scanned areas of the subject copy fall upon the photo cathode of the tube P1 thereby to change the effective internal resistance of the tube in the well known manner. An operating potential for the photoelectric cell P1 is furnished by means of a bleeder resistor consisting of two resistors *r1* and *r2* which are connected in series across a source of direct power. The collector anode of the photoelectric cell P1 is connected to the common junction of the resistors *r1* and *r2*. The cathode of the photoelectric cell P1 is connected directly to opposite grounded end of the resistor *r2*. As the direct power source is of conventional design well known to those skilled in the art only the output terminals thereof, designated respectively B+ and B—, are shown. The multiplier elements of the multiplier photocell and its negative voltage supply are not shown as they form no part of the present invention.

The common junction of the resistors *r1* and *r2* is also connected to the control electrode of a vacuum tube V1 which is preferably of the pentode type such as is commercially designated 6AK5. The screen grid and anode of the tube V1 are coupled to the B+ terminal of the power source by means of resistors *r3* and *r4* respectively. The tube V1 is biased, as will be described in detail hereinafter, by connecting the cathode to an intermediate tap of a biasing resistor consisting of resistors *r5* and *r6* which are connected in series across the direct power source terminals B+ and B—. The suppressor grid of the tube V1 is also connected to the same tap. The ratio of the effective ohmic values of the resistors *r5* and *r6* can be changed by making the resistor *r5* or *r6* adjustable, thereby to determine the bias upon the tube, With an increase in the amount of light incident upon the photoelectric cell P1, the effective impedance of the cell is lowered so that the control electrode of the vacuum tube V1 becomes relatively more negative until a value, determined by the proportioning of the ohmic values of the resistors *r5* and *r6* is reached at which the tube V1 will be cut off, i. e., it will not conduct. When subsequently less light is incident upon the photoelectric cell P1, the effective impedance thereof increases the control electrode of the tube V1 and becomes relatively more positive so that at the value determined by the setting of the resistor *r5*, the tube conducts.

The above described action will be apparent from a consideration of voltage-time curve, designated by the Roman numeral I, which corresponds to the variation of the D. C. voltage with respect to ground impressed upon the control electrode of the tube V1 (as at the junction I of Fig. 1), when a conventional facsimile signal is obtained by scanning a subject copy, such as a printed page, by means of the photoelectric cell P1. The square waves at the beginning and end of the curve are the black phasing pulses and the intermediate portions correspond to variations in signal strength as the white and black portions of the printed page are successively scanned. The resulting output of the tube V1 is shown by the curve designated by II which corresponds to the variations of the anode potential with respect to ground appearing at the junction designated II in Fig. 1, the signal being amplified and inverted by the amplifying action of the tube V1. It will be noted that the bottom portions or black range of the signal are attenuated by the saturation of the tube V1, the amplitude of phasing pulses and the signal which would have resulted in the absence of such phenomena being indicated by the broken lines. The top portions or white range of the signal are clipped to a definite amplitude by the cut off action of tube V1.

It has been found that the above described operation is obtained with type 6AK5 and 931–A tubes by using circuit elements having the following values:

| | |
|---|---|
| *r1* | 500k |
| *r2* | 250k |
| *r3* | 54k |
| *r4* | 9k |
| *r5* | 45k |
| *r6* | 10k |

The anode of tube V1 is coupled by means of a capacitor *c1* to the control electrode of an amplifying tube V2 which is preferably one half of a double triode such as a type 6SN7 or 12AU7 tube. The anode of the tube V2 is connected to the B+ terminal of the direct power source by means of a load resistor *r7*. The cathode of the tube V2 is connected directly to the grounded negative power source terminal B— and a relatively large negative bias (in the order 15 to 20 volts) is supplied to the control electrode either from a battery (not shown) or from a stabilized section of the direct power source supply. The bias potential is applied to the control electrode of the tube V2 by means of two terminals *t3* and *t4* and a series resistor *r8* so that the peaks of the anode potential of tube V2 as at the junction designated III are clipped thus establishing a more constant maximum signal level than that determined by the saturation of the tube V1. As is shown in the curve designated III, the signal is further amplified and the phase thereof again reversed.

The anode of tube V2 is coupled by means of a capacitor *c3* and a resistor *r9* with the control electrode of a tube V3 which is preferably located within the same enclosing envelope as the tube V2. The cathode of the tube V3 is connected to ground by means of a cathode follower resistor *r10* the output of the V3 stage being taken from the cathode resistor so as to obtain an impedance match with the coaxial cable (not shown) by means of which the transmitter unit illustrated in Fig. 1 is connected to the receiving unit illustrated in Fig. 2. The anode of the tube V3 is connected to the B+ terminal by means of a variable load resistor *r11* which is adjusted so that the saturation current flows through the tube whenever its control electrode reaches the definite maximum positive signal level as determined by the clipping action of the tube V2. Since the signal has been greatly amplified by the action of tube V2 the maximum negative signal level cuts off the output of tube V3 and results in zero signal level thus establishing two signal levels as is shown by the curve IV.

The receiving unit shown in Fig. 2 comprises a vacuum tube V4 such as a type 6SN7, whose control electrode is coupled by means of a capacitor *c4* and a resistor *r13* to a potentiometer *r12* which is connected across the two input terminals of the unit. A load resistor *r14* connects the anode of the tube V4 to the B+ terminal of a direct current power source (not shown). The cathode of the tube V4 is grounded through a biasing resistor *r15* which is paralleled by a by-pass capacitor *c5* so that the tube acts as a conventional first stage amplifier.

The output of the tube V4 is impressed upon the control electrode of a tube V5, such as a 6V6, by means of a network including a capacitor *c6* which is interposed between the anode of the tube V4 and the control electrode of the tube V5 and a resistor *r16* which connects the control electrode to ground. The screen grid and anode of the tube V5 are connected to the B+ terminal of the power supply by the resistors *r17* and *r18* respectively. A screen capacitor *c9* is interconnected between the screen grid and ground. The cathode of the tube V5 is directly connected to ground so that the tube operates without bias upon its control electrode.

A capacitor *c7* couples the anode of the tube V5 with the control electrodes of the double triodes V6, which may be enclosed in the envelope of a 6AS7G type of tube or a single triode such as 6CD6, used to print on a facsimile recorder R such as any one of the types well known to those skilled in the art. To this end the anodes of the tube V6 are connected in series parallel with the recorder R to the positive terminal of the recorder power supply (not shown). The negative terminal of the recorder power supply is directly connected to the cathodes of the tube V6. If the power required to drive the recorder R exceeds the rating of the tube V6 additional power amplifier tubes may be connected in parallel therewith.

A large negative potential is impressed upon the control electrodes of the tube V6 to make certain the bias upon the control electrodes is sufficient to cut off the tube in the absence of a large positive signal. To this end a direct power source (not shown) supplying a potential of approximately 150 volts is connected to terminals *t1* and *t2* with the polarity indicated so that a tapped bleeder resistor *r19* is connected thereacross. The tap of the resistor *r19*, which is preferably adjustable, is electrically linked with the control electrodes of the tube V6 by means of a resistor *r20*, a stabilizing capacitor *c8* being interposed between the resistor tap and ground.

A clamp is used to limit the upper value of the potential impressed upon the control electrodes of the tube V6 thereby preventing the electrodes from drawing excess power. This is accomplished by connecting the anode *a1* and the cathode *k1* of a double diode V7 such as a type 6H6 tube, to the control electrodes and cathodes respectively of the power tube V6. The anode *a2* and the cathode *k2* of the other half of the double diode V7 are connected respectively to the tap of the resistor *r19* and the common junction of the capacitor *c7* and the resistor *r20*. These connections provide a path in parallel with the resistor *r20* and the effective portion of the resistor *r19* whereby negative charge may be more quickly drained from the capacitor than the circuit constants of the resistors *r19* and *r20* would otherwise allow thereby to eliminate the tendency of such residual charge to cause shadows or "ghosts" upon the record during abrupt changes from black to white in the subject copy.

From the above description it will be apparent that when a subject copy is scanned by the photoelectric cell P1 in any of the well known manners, all signals from whites or grays, which result in impinging upon the phototube P1 of an amount of light exceeding an intensity of a value predetermined by the adjustment of the resistor r5, are cut off by the action of the tube V1. The clipping action of the succeeding stage tube V2 attenuates the peaks of the signal resulting from black and darker shades. In practice the width of the band between amplitudes of the respective signals which separates the cut off of the lighter shade signals from the clipping level of the darker shade signals can be made so narrow with respect to the overall amplitude of the amplified signal that in effect a signal potential is applied to the control electrode of the tube V3, which will result in saturation of the tube when the light intensity incident upon the photoelectric cell P1 is below a level selected by the adjustment of the resistor r5; and conversely, no signal potential is applied to the tube V3 when the amount of light incident upon the photoelectric cell is above what is substantially the same level.

When the saturation current flows through the tube V3 due to a light level below the predetermined level as described above, the voltage drop across the cathode resistor r10 is impressed across the input potentiometer of the receiver unit by a communication link such as a coaxial cable. The potentiometer r12 is adjustable to compensate for attenuation in the communication link so that a potential which is within the operational limits of the tube V4 is impressed upon the control electrode thereof. The tube V4 and associated circuit elements act as a conventional stage of voltage application. The tube V5 acts as a driver stage for the control electrodes of the power tube V6, being operated without bias to obtain the highest peaks of the signal at the anode output. When the control electrodes of the power amplified tube V6 are driven by the tube V5 to a positive potential whose maximum value is determined by the clamping action of the diode V7, as described heretofore, saturation current flows through the tube V6 and the recorder R thereby to mark the recording paper therein. It is to be particularly noted that the amount of current flow through the recorder R, and hence the density of the mark upon the recording paper is the same irrespective of the shade of gray or black if such shade reflects an amount of light less than the predetermined level or amount. Conversely, if the amount of a light reflected from a shade of gray or white is greater than the predetermined level or amount no signal is sent to the receiving unit shown in Fig. 2. In the latter case the control electrodes of the tube V6 are therefore maintained relatively negative by the large biasing potential applied to the terminals t1 and t2 so that the tube is cut off. As in this condition, no current flows through the recorder R, the recording paper is left blank or "white."

It should be understood that the present disclosure is for the purpose of illustration only and that this invention includes all modifications and equivalents which fall within the scope of the appended claims.

I claim:

1. For transmitting an electrical signal defining a facsimile of subject copy having white and black ranges of light values, a modulation system comprising a photoelectric device having an output electrode and responsive to said copy to produce signals at said output electrode, said signals having voltage ranges corresponding to said ranges of light values, an electronic amplifying valve, means connecting said output electrode and said valve to apply said signals thereto, means biasing said valve below cutoff by a voltage greater than said white range and less than said black and white ranges, whereby said valve passes an amplified signal voltage in which black values are included and from which white values are omitted, a clipping valve, means biasing said clipping valve below cutoff by a voltage less than said amplified black value signal, and means connecting said valves so that the black values of said amplified signal are clipped to a predetermined level.

2. For transmitting an electrical signal defining a facsimile of subject copy having white and black ranges of light values, a modulation system comprising a photoelectric device having an output electrode and responsive to said copy to produce signals at said output electrode, said signals having voltage ranges corresponding to said ranges of light values, an electronic valve, means connecting said output electrode and said valve to apply said signals thereto, means biasing said valve below cutoff by a voltage greater than said white range and less than said black and white ranges, whereby said valve passes a modified signal voltage in which black values are included and from which white values are omitted, an amplifier producing an amplified black value signal of said modified signal, said amplifier including an output valve biased to vary between conductance and cutoff by a voltage less than said amplified black value signal, and means connecting the first said valve with said amplifier to apply said modified signal thereto so that said amplifier produces an output black value signal varying between predetermined minimum and maximum voltages.

3. For transmitting an electrical signal defining a facsimile of subject copy having white and black ranges of light values, a modulation system comprising a photoelectric device having an output electrode and responsive to said copy to produce signals at said output electrode, said signals having voltage ranges corresponding to said ranges of light values, an electronic valve, means connecting said output electrode and said valve, means biasing said valve below cutoff by a voltage greater than said white range and less than said black and white ranges, whereby said valve passes a modified signal voltage in which black values are included and from which white values are omitted, an amplifier producing an amplified black value signal of said modified signal, said amplifier including an output valve biased to vary between conductance and cutoff by a voltage less than said amplified black value signal, and means connecting the first said valve with said amplifier to apply said modified signal thereto so that said amplifier produces an output black value signal varying between predetermined minimum and maximum voltages, said amplifier including a clipping valve and means biasing said clipping valve below cutoff by a voltage less than said modified black value signal, so that black values of said modified signal are clipped to a predetermined level.

References Cited in the file of this patent

UNITED STATES PATENTS

| | | |
|---|---|---|
| 2,326,740 | Artzt | Aug. 17, 1943 |
| 2,376,034 | Collings | May 15, 1945 |
| 2,420,731 | Artzt | May 20, 1947 |
| 2,519,057 | Luck | Aug. 15, 1950 |
| 2,526,509 | Shawhan | Oct. 17, 1950 |
| 2,545,463 | Hester | Mar. 20, 1951 |
| 2,559,173 | Shawhan | July 3, 1951 |

OTHER REFERENCES

"Principles of Radar," 2nd edition M. I. T. Radar School Staff, McGraw Hill Company, New York 1946; page 2–10.